(12) United States Patent
Jensen et al.

(10) Patent No.: US 11,941,535 B2
(45) Date of Patent: Mar. 26, 2024

(54) COMPUTER-IMPLEMENTED METHOD OF MODIFYING AN ALGORITHM OPERATING ON A COMPUTING SYSTEM

(71) Applicant: BRITISH TELECOMMUNICATIONS PUBLIC LIMITED COMPANY, London (GB)

(72) Inventors: Kjeld Jensen, London (GB); Stephen Cassidy, London (GB); Botond Virginas, London (GB); David Rohlfing, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 103 days.

(21) Appl. No.: 17/773,105

(22) PCT Filed: Sep. 8, 2020

(86) PCT No.: PCT/EP2020/075053
§ 371 (c)(1),
(2) Date: Apr. 29, 2022

(87) PCT Pub. No.: WO2021/083573
PCT Pub. Date: May 6, 2021

(65) Prior Publication Data
US 2022/0383139 A1  Dec. 1, 2022

(30) Foreign Application Priority Data

Oct. 30, 2019 (EP) ..................................... 19206266
Oct. 30, 2019 (GB) ..................................... 1915750

(51) Int. Cl.
*G06N 5/01* (2023.01)
*G06N 20/00* (2019.01)
*H04M 3/24* (2006.01)

(52) U.S. Cl.
CPC ............... *G06N 5/01* (2023.01); *G06N 20/00* (2019.01); *H04M 3/241* (2013.01)

(58) Field of Classification Search
CPC .......... G06N 5/01; G06N 20/00; H04M 3/241
(Continued)

(56) References Cited

U.S. PATENT DOCUMENTS 6,356,889 B1  3/2002 Lohman
6,513,025 B1  1/2003 Rosen
(Continued)

FOREIGN PATENT DOCUMENTS

CN    1795473 A   6/2006
CN    104780217 A  7/2015
(Continued)

OTHER PUBLICATIONS

Written Opinion of the International Preliminary Examining Authority dated Nov. 15, 2017 for PCT/EP2016/080491 (7 pages).
(Continued)

*Primary Examiner* — Binh Kien Tieu
(74) *Attorney, Agent, or Firm* — Nixon & Vanderhye P.C.

(57) ABSTRACT

This invention provides a computer-implemented method of modifying an algorithm operating on a computing system, and a device for implementing said method, the method comprising the steps of: applying the algorithm to a first set of inputs; determining a relevance score for a first input of the first set of inputs based on: a first effectiveness value of the first input, wherein the first effectiveness value represents a contribution of first input to the algorithm, and a first computational cost of the first input, wherein the 1 first computational cost represents the computational resources of using the first input in the algorithm; defining a second set of inputs based on the determined relevance score of the first input; and applying the algorithm to the second set of inputs.

20 Claims, 5 Drawing Sheets

(58) Field of Classification Search
USPC .................................................... 379/1.01
See application file for complete search history.

(56) References Cited

U.S. PATENT DOCUMENTS

| | | | |
|---|---|---|---|
| 7,292,152 | B2 | 11/2007 | Torkkola et al. |
| 7,805,388 | B2 | 9/2010 | Weston et al. |
| 8,401,986 | B1 | 3/2013 | Franke |
| 11,201,969 | B2* | 12/2021 | Horsley ............... H04B 3/32 |
| 2002/0164070 | A1 | 11/2002 | Kuhner |
| 2004/0059966 | A1 | 3/2004 | Chan |
| 2004/0252027 | A1 | 12/2004 | Torkkola et al. |
| 2005/0015683 | A1 | 1/2005 | Clark et al. |
| 2005/0132052 | A1 | 6/2005 | Uttamchandani |
| 2007/0036339 | A1* | 2/2007 | Cioffi ............... H04M 3/304 |
| | | | 379/399.01 |
| 2007/0174292 | A1 | 7/2007 | Li |
| 2008/0250265 | A1 | 10/2008 | Chang |
| 2009/0177697 | A1 | 7/2009 | Gao |
| 2009/0327172 | A1 | 12/2009 | Liu et al. |
| 2010/0145647 | A1 | 6/2010 | Bouchard et al. |
| 2010/0223499 | A1 | 9/2010 | Panigrahy et al. |
| 2011/0051906 | A1 | 3/2011 | Cioffi et al. |
| 2011/0185220 | A1 | 7/2011 | Foley |
| 2011/0282813 | A1 | 11/2011 | Sgro et al. |
| 2013/0154569 | A1 | 6/2013 | Endo et al. |
| 2014/0068330 | A1 | 3/2014 | Hecox |
| 2014/0156568 | A1 | 6/2014 | Ganguly |
| 2014/0304408 | A1 | 10/2014 | Rhee |
| 2015/0039540 | A1 | 2/2015 | Dong |
| 2015/0106165 | A1 | 4/2015 | Rai |
| 2015/0106485 | A1 | 4/2015 | Chaudhuri |
| 2015/0165525 | A1 | 6/2015 | Jonasson |
| 2015/0185108 | A1 | 7/2015 | Baek et al. |
| 2015/0254555 | A1 | 9/2015 | Williams, Jr. et al. |
| 2015/0379426 | A1 | 12/2015 | Steele et al. |
| 2017/0026521 | A1* | 1/2017 | Horsley ............... H04L 5/14 |
| 2018/0018553 | A1 | 1/2018 | Bach et al. |
| 2018/0343171 | A1* | 11/2018 | Jensen ............... H04L 41/16 |
| 2019/0258807 | A1* | 8/2019 | DiMaggio ............ G06F 21/577 |
| 2022/0147009 | A1* | 5/2022 | Cooley ................ G05B 19/054 |
| 2022/0383139 | A1* | 12/2022 | Jensen ................ H04M 3/241 |

FOREIGN PATENT DOCUMENTS

| | | |
|---|---|---|
| EP | 2 375 637 | 10/2011 |
| IN | 6322/CHE/2015 | 1/2016 |
| WO | 2006129145 | 12/2006 |
| WO | 2013154569 A1 | 10/2013 |
| WO | 2015165525 A1 | 11/2015 |
| WO | 2015185108 A1 | 12/2015 |
| WO | 2017/102601 | 6/2017 |
| WO | 2017102598 | 6/2017 |
| WO | 2017102602 | 6/2017 |
| WO | 2019076541 | 4/2019 |

OTHER PUBLICATIONS

Combined Search and Examination Report under Sections 17 and 18(3) dated Aug. 9, 2016 for GB1522390.2 (6 pages).
Translation of First Notification of Office Action dated Aug. 3, 2020 for Chinese Application No. 201680074231.4 (6 pages).
International Search Report dated Mar. 8, 2017 for International Application No. PCT/EP2016/080491 (10 pages).
International Preliminary Report on Patentability issued in PCT/EP2016/084091 dated Mar. 12, 2018 (16 pages).
Extended European Search Report dated Mar. 31, 2020 for European Application No. 19206266.9 (8 pages).
Combined Search and Examination Report under Sections 17 and 18(3) dated Apr. 22, 2020 for GB 1915750.2 (7 pages).
Examination Report under Section 18(3) dated Nov. 12, 2020 for GB1915750.2 (3 pages).
Written Opinion of the International Preliminary Examining Authority dated Oct. 18, 2021 for International Application No. PCT/EP2020/075053 (10 pages).
International Preliminary Report on Patentability dated Feb. 28, 2022 for International Application No. PCT/EP2020/075053 (18 pages).
International Search Report and Written Opinion dated Mar. 24, 2021 for International Application No. PCT/EP2020/075053 (14 pages).
Written Opinion of the International Preliminary Examining Authority dated Jan. 31, 2022 for International Application No. PCT/EP2020/075053 (11 pages).
Javad Basiri and Fattaneh Taghiy Areh "An Application of the CORER Classifier on Customer Churn Prediction", 6th International Symposium on Telecommunications (IST'2012) (6 pages).
International Search Report and Written Opinion of the International Searching Authority dated Mar. 10, 2017 for International Application No. PCT/EP2016/080497 (11 pages).
Extended European Search Report dated Jun. 8, 2016 for European Application No. 15201207.6 (7 pages).
Extended European Search Report dated Apr. 20, 2018 for European Application No. 17197379.5 (12 pages).
International Preliminary Report on Patentability dated Mar. 12, 2018 for International Application No. PCT/EP2016/080491 (16 pages).
International Preliminary Report on Patentability dated Jun. 19, 2018 for International Application No. PCT/EP2016/080497 (9 pages).
Extended European Search Report dated Jun. 8, 2016 issued in Application No. EP 171 973 79 (8 pages).
Combined Search and Examination Report dated Jun. 10, 2016, issued in Application No. GB 1522392.8 (6 pages).
Extended European Search Report dated May 31, 2016 issued in Application No. EP 15201213.4 (9 pages).
Combined Search and Examination Report dated Jun. 10, 2016, issued in Application No. GB 1522410.8 (6 pages).
Extended European Search Report dated May 31, 2016 issued in Application No. EP 15 20 1213 (9 pages).
International Search Report and Written Opinion issued in PCT/EP2016/080503 dated Jan. 11, 2017 (15 pages).
International Preliminary Report on Patentability issued in PCT/EP2016/080503 dated Jan. 25, 2018 (8 pages).
Written Opinion of the International Preliminary Examining Authority issued in PCT/EP2016/080503 dated Nov. 30, 2017 (9 pages).
International Search Report and Written Opinion issued in PCT/EP2016/080508 dated Feb. 8, 2017 (12 pages).
Costa, et al., "An Intelligent Alarm Management System for Large-Scale Telecommunication Companies", L. Seabra Lopes et al. (Eds.): EPIA 2009, LNAI 5816, pp. 386-399, 2009, © Springer-Verlag Berlin Heidelberg 2009 (14 pages).
Yang, et al. "Moderated VFDT in Stream Mining Using Adaptive Tie Threshold and Incremental Pruning", Department of Science and Technology, University of Macau, A. Cuzzocrea and U. Dayal (EDs.): DaWaK 2011, LNCS 6862, pp. 471-483. 2011 © Springer-Verlag Berlin Heidelberg 2011 (13 pages).
Alpaydin, "Introduction to Machine Learning", 2nd Edition, Chapters 1 and 9, MIT Press 2010 (43 pages).
Salfner, et al., "A Survey of Online Failure Prediction Methods" ACM Computing Surveys, vol. 42, No. 3, Article 10, Publication Date: Mar. 10, 2010 (42 pages).
Irrera, et al., "A Practical Approach for Generating Failure Data for Assessing and Comparing Failure Prediction Algorithms", 2014 IEEE 20th Pacific Rim International Symposium on Dependable Computing (10 pages).
Lemos, et al., "Fuzzy Multivariate Gaussian Evolving Approach for Fault Detection and Diagnosis", E. Hullermerer, R. Kruse and F. Hoffman (Eds), IPMU 2010 LNAI 6178, pp. 360-369, 2010 (10 pages), © Springer-Verlag Berlin Heidelberg 2010 (10 pages).
Moshtaghi, et al., "Evolving Fuzzy Rules for Anomaly Detection in Data Streams" IEEE Transactions on Fuzzy Systems vol. 23, No. 2, Jun. 2015 (12 pages).

(56) References Cited

OTHER PUBLICATIONS

Luo, Optimization Design of Cascaded Classifiers, 2005 IEEE Computer Society Conference on Computer Vision and Pattern Recognition (CVPR'05) (Year: 2005).
Sun, Improving Iris Recognition Accuracy via Cascaded Classifiers, IEEE Transactions on Systems, vol. 35, No. 3, Aug. 2005 (Year: 2005).
Office Action dated Nov. 27, 2019 issued for U.S. Appl. No. 15/776,918 (19 pages).
Office Action dated Jun. 1, 2020 issued for U.S. Appl. No. 15/776,918 (16 pages).
Office Action dated Nov. 4, 2020 issued for U.S. Appl. No. 15/776,918 (22 pages).
Office Action dated Feb. 12, 2021 issued for U.S. Appl. No. 15/776,918 (19 pages).
Office Action dated Aug. 17, 2021 issued for U.S. Appl. No. 15/776,918 (25 pages).
Office Action dated Jul. 1, 2022 issued for U.S. Appl. No. 16/754,515 (12 pages).
English Translation of $2^{nd}$ Notification of Office Action dated Jun. 9, 2023, issued for Chinese Application No. 201880067981.8 (4 pages).
Examination Report dated Jun. 21, 2023, issued for European Application No. 18 765 455.3 (7 pages).
Advisory Action dated Mar. 10, 2023, issued for U.S. Appl. No. 16/754,515 (4 pages).

\* cited by examiner

COMPUTER-IMPLEMENTED METHOD OF MODIFYING AN ALGORITHM OPERATING ON A COMPUTING SYSTEM

This application is the U.S. national phase of International Application No. PCT/EP2020/075053 filed Sep. 8, 2020 which designated the U.S. and claims priority to EP 19206266.9 filed Oct. 30, 2019, and GB 1915750.2, filed on Oct. 30, 2019, the entire contents of each of which are hereby incorporated by reference.

FIELD OF THE INVENTION

The present invention relates to a method of modifying an algorithm operating on a computing system.

BACKGROUND

Computing systems have been used widely for decades as programmable devices for performing certain processes. These processes typically involve an algorithm acting on a set of inputs (e.g. data) to produce an output (e.g. a decision). The algorithm is typically created manually by a human operative to define how the set of inputs are processed. For example, in a decision tree algorithm, each node of the decision tree represents a test on an input (or a combination thereof), and a branch of such nodes represent a sequence of tests in order to produce an output.

A computing system may also manage a particular algorithm (such computing systems are often referred to implementing an "autonomic" process). The autonomic process may make modifications to the algorithm by utilising machine learning processes, which act on operational data for the computing system and generate algorithm modifications. For example, in the decision tree algorithm, the machine learning process may modify the test represented by a node of the decision tree.

It is desirable to improve the method of modifying an algorithm in a computing system.

SUMMARY OF THE INVENTION

According to a first aspect of the invention, there is provided a computer-implemented method of modifying an algorithm operating on a computing system, the method comprising the steps of: applying the algorithm to a first set of inputs; determining a relevance score for a first input of the first set of inputs based on: a first effectiveness value of the first input, wherein the first effectiveness value represents a contribution of first input to the algorithm, and a first computational cost of the first input, wherein the first computational cost represents the computational resources of using the first input in the algorithm; defining a second set of inputs based on the determined relevance score of the first input; and applying the algorithm to the second set of inputs.

The second set of inputs may be based on the first set of inputs with the first input removed. The first input may be a candidate input, and the step of defining the second set of inputs may include accepting the first input.

The method may further comprise the steps of: determining a relevance score for a second input of the first set of inputs, wherein the second input is a candidate input, based on: a second effectiveness value of the second input, wherein the effectiveness value represents a contribution of the second input to the algorithm, and a second computational cost of the second input, wherein the second computational cost represents the computational resources of using the second input in the algorithm; defining the second set of inputs based on the determined relevance score of the first input and second input, wherein the second set of inputs is based on the first set of inputs with the first input removed and further includes accepting the second input.

The second set of inputs may include a new candidate input.

The first computational cost may include one or more of the processing cost, storage cost and transmission cost associated with the first input, and the second computational cost may include one or more of the processing cost, storage cost and transmission cost associated with the second input.

The algorithm may be updated by a machine learning process.

The first input may represent a combination of parameters.

A value of the first input may be determined by a data gathering node, and the first input may be pre-processed by the data gathering node.

According to a second aspect of the invention, there is provided a computer program product comprising instructions which, when the program is executed by a computer, cause the computer to carry out the method of the first aspect of the invention. The computer program product may be stored on a computer-readable data carrier.

According to a third aspect of the invention, there is provided a device for modifying an algorithm operating on a computing system, the algorithm operating on a first set of inputs, the device comprising a processor configured to: determine a relevance score for a first input of the first set of inputs based on: a first effectiveness value of the first input, wherein the effectiveness value represents a contribution of the first input to the algorithm, and a first computational cost of the first input, wherein the first computational cost represents the computational resources of using the first input in the algorithm; defining a second set of inputs based on the determined relevance score of the first input; and causing the algorithm to use the second set of inputs.

BRIEF DESCRIPTION OF THE FIGURES

In order that the present invention may be better understood, embodiments thereof will now be described, by way of example only, with reference to the accompanying drawings in which.

DETAILED DESCRIPTION OF EMBODIMENTS

Figure 1:
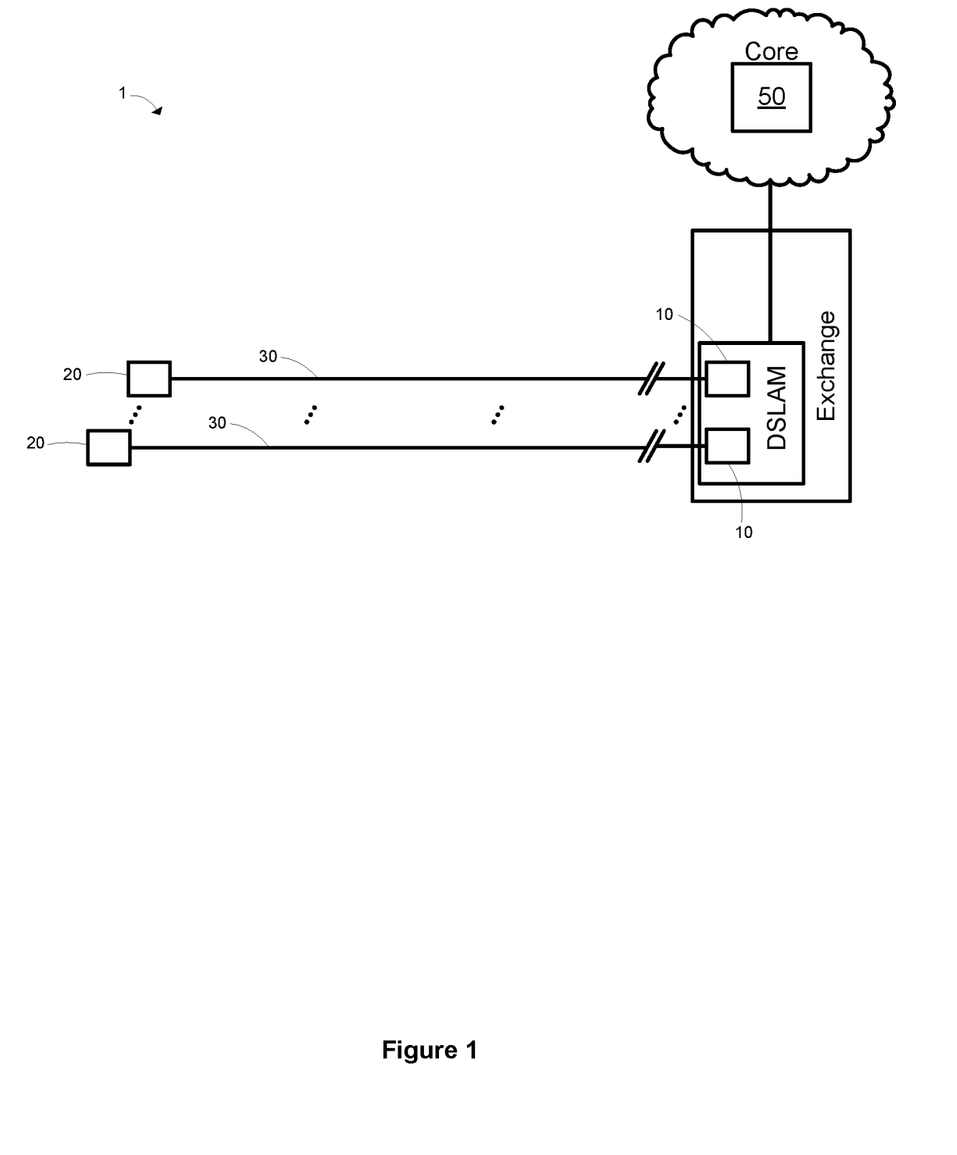
FIG. 1 is a schematic diagram illustrating a Digital Subscriber Line (DSL) system of a first embodiment of the present invention.

A first embodiment of the present invention will now be described with reference to FIGS. 1 and 2. FIG. 1 illustrates a Digital Subscriber Line (DSL) telecommunications system 1 having a plurality of subscriber lines 30, wherein each subscriber line is terminated at opposing ends by a Termination Unit-Central (TU-C, based in a telephone exchange) 10 and a Termination Unit-Remote (TU-R, based in the customer's premises) 20. The DSL system 1 is connected to a core network, which includes a DLM engine 50.

Figure 2:
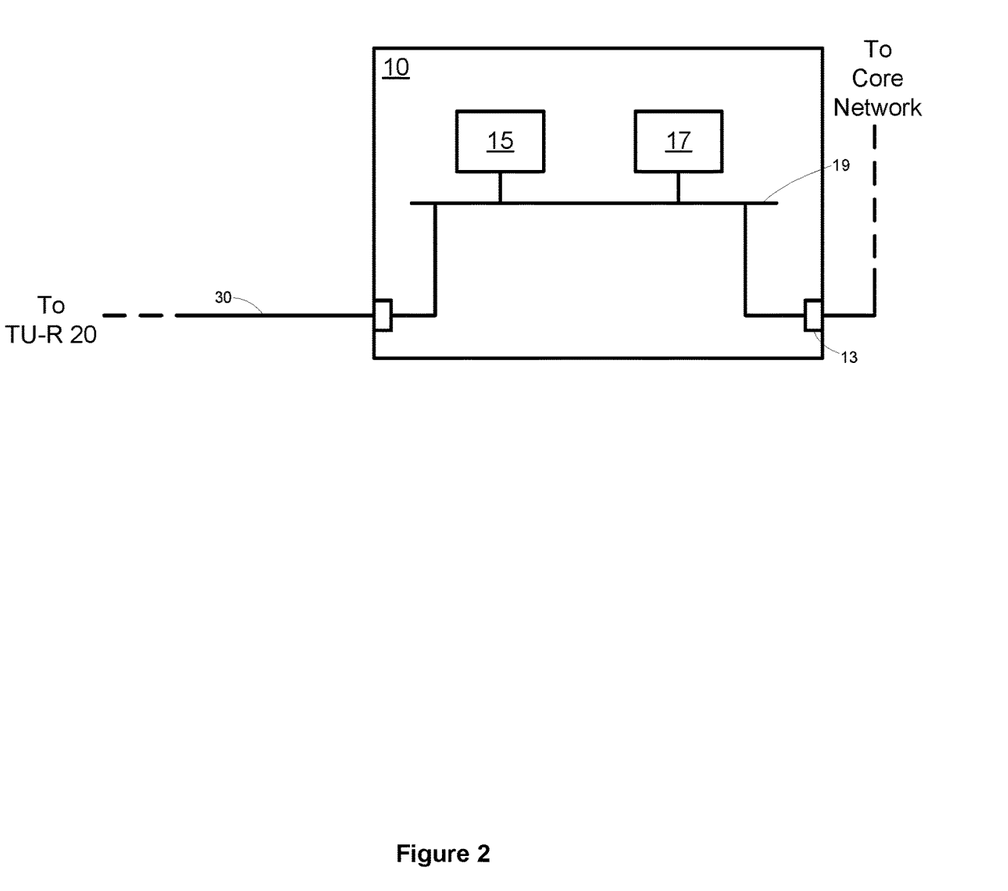
FIG. 2 illustrates a Termination Unit of the DSL system of FIG. 1.

The TU-C 10 is shown in more detail in FIG. 2. The TU-C 10 includes a first communications interface 11 connected to the subscriber line 30 and configured to communicate with the TU-R 20 over the subscriber line 30, a second communications interface 13 connected to the core network of the DSL system 1, a processor 15 and memory 17, all connected via bus 19. The processor 15 implements a monitoring module configured to monitor properties of the subscriber line 30 and store values for these monitored properties as operational data in memory 17 (together with timestamps). In this embodiment, the monitoring module records operational data relating to:

Fault monitoring (in the form of alarm indications following a failure or in the form of alert messages following threshold crossing), such as Loss of Signal (LoS) failures, Loss of Frame (LoF) failures, and Loss of Power (LPR) failures;

Performance monitoring parameters, such as Forward Error Correction (FEC) seconds, errored seconds, severely errored seconds, a full initialisation count, a failed full initialisation count, a short initialisation count, and a failed short initialisation count;

Configuration parameters, such as downstream/upstream maximum nominal power spectral density, downstream/upstream PSD mask, downstream/upstream rate adaptation mode, minimum data rate, and maximum bit error ratio;

Inventory parameters, such as a TU-C vendor identifier; and

Test, diagnostic and status parameters, such as the line power management state.

The TU-C 10 is configured to periodically report all operational data stored in memory 17 to the DLM engine 50. This data may be used in the following embodiment of a method of the present invention.

Figure 3:
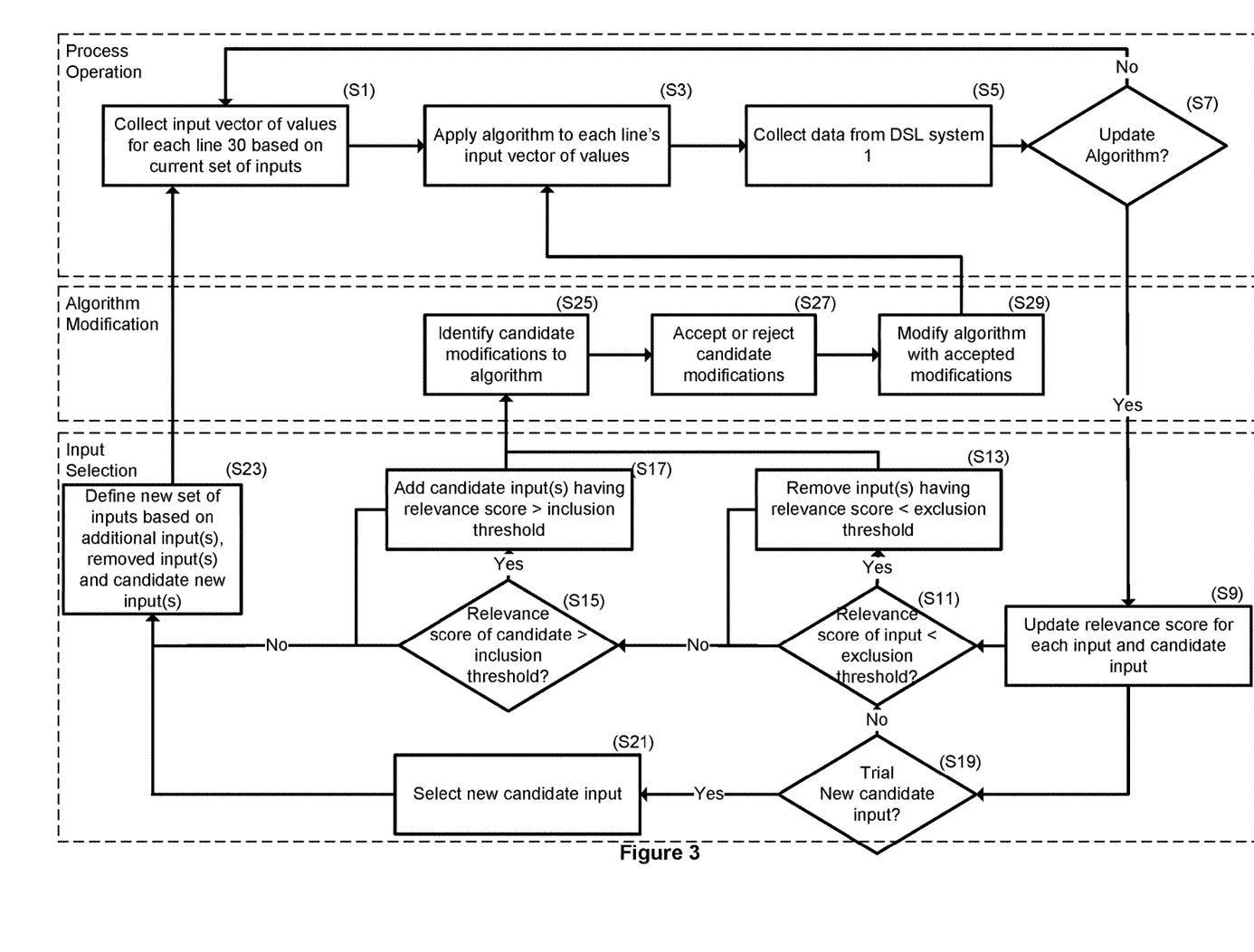
FIG. 3 is a flow diagram illustrating a first embodiment of a method of the present invention.

A first embodiment of a method of the present invention will now be described with reference to FIG. 3. In this first embodiment, the DLM module 50 is configured to implement an algorithm for selecting, for each subscriber line 30 in the DSL system 1, an optimal operating profile from a set of operating profiles, each one specifying one or more operating parameters (such as synchronisation rate, error correction technique, etc.) in order to optimise two performance goals of improving a synchronisation rate and to minimise an error rate. In this embodiment, the algorithm is a decision tree which uses, as an input, one or more of the monitored properties of each subscriber line 30 (stored in memory 17) and outputs an identifier for the selected operating profile ($P_1$ to $P_N$, where there are N operating profiles) for each subscriber line 30.

As noted above, the monitoring module records operational data for several properties of each subscriber line 30 of the DSL system 1 and stores this operational data in memory 17 (together with a timestamp). In a first iteration of this embodiment, in step S1, the DLM module 50 retrieves a value for each input of a set of inputs, in which each input of the set of inputs represents a particular monitored property of the stored operational data. In this example, this set of inputs represents four monitored properties: LoS failures, errored seconds, full initialisation count, and downstream maximum nominal power spectral density. A value for each input of the set of inputs is retrieved for each subscriber line 30. The DLM engine 50 therefore has a first input vector of attribute values for a first subscriber line, a second input vector of attribute values for a second subscriber line, etc., which may then be used in the decision tree algorithm.

In step S3, the DLM engine 50 implements the algorithm by applying the decision tree to each subscriber line's input vector of attribute values in order to select an operating profile for that subscriber line 30. If the selected operating profile is different to the current profile for that subscriber line 30, then the DLM engine 50 initiates a change on that subscriber line 30 so that the TU-C 10 and TU-R 20 switch to the selected operating profile.

In step S5, the monitoring module collects data from the DSL system 1 relating to the algorithm's outputs and subsequent performance of each subscriber line 30. This will be discussed in more detail below.

In step S7, the DLM engine 50 determines whether an algorithm update function should be performed. This may be based, for example, on a timer or counter so that the algorithm is updated at a suitable frequency. If the output of this decision is negative, then the DLM engine 50 loops back to step S1. In this embodiment, the output of the decision in step S7 is positive so that the DLM engine 50 performs the algorithm update function by advancing to step S9. The purpose of the algorithm update function is to update the algorithm (such as, for example, by changing one or more thresholds of nodes in the decision tree) in order to improve its operation relative to its performance goals (which may also be updated). In this embodiment, the algorithm update function further includes a determination as to whether or not to modify a membership of the set of inputs by either introducing a new input to the set of inputs or by removing an existing input from the set of inputs. This determination is based on a calculated relevance score for each input from the set of inputs. If the membership is modified, then subsequent iterations of the method of this invention will retrieve and utilise a different set of inputs as the algorithm's input vector of attribute values in its decision tree algorithm.

In step S9, the DLM engine 50 calculates a relevance score for each input of the set of inputs. This relevance score is based on both 1) a calculated value representing the effectiveness of each input in the decision tree algorithm, and 2) a computational cost associated with each input. In this embodiment, the effectiveness value is calculated using a surrogate method utilising a plurality of surrogate decision tree algorithms, in which each surrogate decision tree algorithm is derived from similar principles as the main decision tree algorithm of step S3 but without any reference to a particular input. More explicitly, the surrogate algorithms are derived using the same technique as used for the algorithm of step S3, but with all training/validation data relating to a particular input removed so that the resulting algorithm does not refer to that particular input. The performance goals used in deriving the surrogate algorithm may be the same as those used in deriving the algorithm step S3, but with the further goal of producing results that correlate with the results of the algorithm of step S3. As there are four monitored properties in this example, four surrogate decision tree algorithms are defined:

1. A first surrogate decision tree algorithm with no reference to LoS failures;
2. A second surrogate decision tree algorithm with no reference to errored seconds;
3. A third surrogate decision tree algorithm with no reference to full initialisation count; and
4. A fourth surrogate decision tree algorithm with no reference to downstream maximum nominal power spectral density.

The four surrogate decision tree algorithms are then applied to the same input vectors of attribute values for each subscriber line 30 (as retrieved in step S1) to determine the operating profile output by those four surrogate decision tree algorithms for each subscriber line 30. If the operating profile outputted by a surrogate decision tree algorithm for a particular subscriber line 30 is the same as the operating profile selected by the main decision tree algorithm for that subscriber line 30 then a match is recorded, and if the operating profile outputted by a surrogate decision tree algorithm for a particular subscriber line 30 is different to the operating profile selected by the main decision tree algorithm for that subscriber line 30 then a mismatch is recorded. By applying the four surrogate decision tree algorithms to all subscriber lines 30, and comparing the results of each to the current decision tree algorithm (of step S3), the DLM engine 50 calculates a percentage of matched operating profiles for each surrogate decision tree algorithm. In this example, the DLM engine 50 calculates:

1. The first surrogate decision tree algorithm (with no reference to LoS failures) matched the current decision tree algorithm on 50% of subscriber lines;
2. The second surrogate decision tree algorithm (with no reference to errored seconds) matched the current decision tree algorithm on 10% of subscriber lines;
3. The third surrogate decision tree algorithm (with no reference to full initialisation count) matched the current decision tree algorithm on 70% of subscriber lines;
4. The fourth surrogate decision tree algorithm (with no reference to downstream maximum nominal power spectral density) matched the current decision tree algorithm on 97% of subscriber lines.

These percentage values provide an objective assessment of how influential a particular input is on the output of the algorithm. In this example, it can be seen that the input 'errored seconds' is highly influential on the decision tree algorithm as only 10% of cases will have the same output if this input is not taken into account. In contrast, it can be seen that the input 'downstream maximum nominal power spectral density' is not very influential on the decision tree algorithm as 97% of cases will have the same output if this input is not taken into account.

Accordingly, an effectiveness value representing the effectiveness of an input may be derived by normalising these percentage values between 0 and 1, in which a value of 0 indicates that the input does not affect any cases of the decision tree algorithm and a value of 1 indicates that the input affects all cases of the decision tree algorithm. In this example, therefore, the effectiveness value for the LoS failures input is 0.5, the effectiveness value for the errored seconds input is 0.9, the effectiveness value for the full initialisation count input is 0.3, and the effectiveness value for the downstream maximum nominal power spectral density input is 0.03.

As noted above, the relevance score is also based on a computational cost of each input of the set of inputs, such as the cost of gathering, storing, transferring and processing that input. In this example, this is based on a weighted sum of the following components:

the processing power required to capture a value for the monitored property at the TU-C 10 and/or TU-R 20;
the storage requirements to store the value of the monitored property at the TU-C 10;
the transmission requirements to transfer the value of the monitored property from the TU-C 10 to the DLM engine 50;
the storage requirements to store the value of the monitored property at the DLM engine 50; and
the proportionate processing power required to process the algorithm with that value (e.g. based on the number of nodes that utilise that value relative to the total number of nodes).

The computational cost is again normalised between 0 and 1 so that a value of 0 indicates that there is practical maximum computational cost associated with the input whereas a value of 1 is a practical minimum computational cost associated with the input. In this example, the computational cost for the LoS failures input is 0.1, the computational cost for the errored seconds input is 0.4, the computational cost of the full initialisation count input is 0.3 and the computational cost of the downstream maximum nominal power spectral density input is 0.5.

In the final sub-step of step S9, the relevance score for each input is calculated by, for example, multiplying each input's effectiveness value and computation cost value. In this example, the relevance scores are therefore:
for LoS failures, 0.05
for errored seconds, 0.36
for full initialisation count, 0.09, and
for downstream maximum nominal power spectral density, 0.015.

In alternative arrangements, the relevance score may be calculated by another mathematical function of both the effectiveness value and computational cost value, wherein the mathematical function may apply a weighting or mathematical operation to one or both of the effectiveness value and computational cost value.

The relevance score therefore provides an assessment of each input's effectiveness to the performance of the algorithm when balanced by its computational cost. In this example, it illustrates that the most relevant input is errored seconds whilst the least relevant input is downstream maximum nominal power spectral density (which happens to match their respective effectiveness values in this instance), and further illustrates that the $2^{nd}$ most relevant input is full initialisation count and $3^{rd}$ most relevant input is LoS failures (note that even though LoS failures is more effective than full initialisation count, its greater computational cost means that it is less relevant than full initialisation count).

Following these calculations, the method advances in parallel to steps S11 and S19. The path starting with step S11 relates to a sub-process of removing one or more inputs from the set of inputs for subsequent instances of the algorithm and of adding one or more candidate inputs to the set of inputs for subsequent instances of the algorithm, and the path starting with step S19 relates to a sub-process of adding new candidate inputs to the set of inputs for subsequent instances of the algorithm. The path starting with step S11 will be described first.

In step S11, the relevance score for each input is compared to an input exclusion threshold representing the relevance score an input must satisfy in order to be used in subsequent instances of the algorithm. If the comparison identifies one or more inputs having a relevance score greater than the input exclusion threshold, then the method proceeds to step S13 in which those inputs are identified for removal from the set of inputs. If this comparison does not identify any inputs having a relevance score greater than the input exclusion threshold, then the method proceeds to step S15. In this example, the input exclusion threshold is set to 0.01, so that the inputs LoS failures, errored seconds and full initialisation count satisfy the threshold whereas the input downstream maximum nominal power spectral density does not satisfy the threshold. Accordingly, in step S13, the input downstream maximum nominal power spectral density is identified for removal from the set of inputs.

Following step S13, the method advances in parallel to steps S15 and S25. In step S15, the relevance score for each candidate input is compared to an input inclusion threshold representing the relevance score a candidate input must satisfy in order to be used in subsequent iterations of the algorithm. In this first iteration of the method, in which there has only been one instance of the algorithm, there are no candidate inputs to be evaluated and so this sub-process will be explained in more detail in the description of the second iteration of the method below. Accordingly, in this first iteration, the comparison of step S15 does not identify any candidate inputs that satisfy the input inclusion threshold.

As noted above, following step S9 the method advances to both steps S11 and step S19. In step S19, it is determined whether to trial one or more new candidate inputs for subsequent instances of the algorithm. This determination may be based on, for example, a count of the number of instances of the algorithm, or a measure of the algorithm's performance (e.g. if the algorithm's performance has not improved for a particular number of iterations). If the determination is negative, then the method returns to step S11 (described above). In this example, the determination is positive and the method proceeds to step S21 in which one or more new candidate inputs are identified for inclusion in subsequent instances of the algorithm. In this example, the new candidate input is the TU-C vendor identifier.

The method then proceeds to step S23 in which a new set of inputs for subsequent instances of the algorithm are defined. This is based on the current set of inputs, the one or more inputs identified for exclusion in step S13, the one or more candidate inputs identified for inclusion in step S17 (discussed below), and the one or more new candidate inputs identified in step S21. In this example in which the current set of inputs includes LoS failures, errored seconds, full initialisation count, and downstream maximum nominal power spectral density, but downstream maximum nominal power spectral density has been identified for exclusion and TU-C vendor identifier has been identified as a new candidate input, the resulting new set of inputs includes inputs LoS failures, errored seconds, and full initialisation count, and candidate input TU-C vendor identifier.

Following this modification of the set of inputs, the method returns to step S1 for a second iteration of the method. Before describing this second iteration, it is noted that the process following step S13 proceeded along the paths starting with steps S15 and S25. The path of step S25 will now be explained. In step S25, a machine learning process is applied to the decision tree algorithm to identify candidate modifications. These candidate modifications are so that the decision tree algorithm is based on any included candidate input (from step S17, described below) but not based on any excluded input (from step S13). The candidate modifications may also be to modify the thresholds of the nodes of the decision tree. In step S27, it is determined whether to accept or reject candidate modifications. This may be based on existing training data identifying, for prior algorithm instances, input vectors for each subscriber line, the algorithm's output for that process instance, and performance of the subscriber line (relative to the performance goals). This training data may also be updated during step S5 for each immediately-preceding algorithm instance.

In step S29, the algorithm is modified based on accepted candidate modifications. The first iteration of the method is now complete, and the second iteration of the method will now be described.

In step S1 of this second iteration, the DLM engine 50 retrieves an input vector based on the new set of inputs (as defined in step S23 of the first iteration of the method), such that it retrieves values for inputs LoS failures, errored seconds, and full initialisation count, and for candidate input TU-C vendor identifier for each subscriber line 30 and, in step S3, the DLM engine 50 performs a second instance of the algorithm (as updated in step S29 of the first iteration of the method) to the input vector for each subscriber line 30 to identify an operating profile for each subscriber line 30. At this stage, the algorithm has not yet been modified to utilise the new candidate input, but the data for this input is collected so that it can be used in the next algorithm modification step.

The second iteration of the method then proceeds as the first iteration, so that data is collected from the DSL system 1 (step S5), it is determined whether or not to update the algorithm (step S7), and, if so, the relevance score for each input and candidate input of the new set of inputs is evaluated (step S9). Again, at this stage, the algorithm has not yet been modified to utilise the new candidate input so it is not possible to define a relevance score for the new candidate input (as the effectiveness value cannot be determined using the surrogate algorithm method detailed above). However, now that data has been collected for the new candidate input, then the algorithm modification steps (S25 to S29) may utilise this as training data. Accordingly, in this second iteration, the algorithm is modified to utilise the new candidate input.

No further changes are made to the algorithm or the set of inputs in this second iteration. The second iteration is now complete, and the third iteration of the method will now be described.

In step S1 of this third iteration, the DLM engine 50 retrieves an input vector on the current set of inputs (being those defined in step S23 of the first iteration), such that it retrieves values for inputs LoS failures, errored seconds, and full initialisation count, and for candidate input TU-C vendor identifier for each subscriber line 30 and, in step S3, the DLM engine 50 performs a third instance of the algorithm (as updated in step S29 of the second iteration of the method) to the input vector for each subscriber line 30 to identify an operating profile for each subscriber line 30. The third iteration of the method then proceeds with the same steps so that data is collected from the DSL system 1 (step S5), it is determined whether or not to update the algorithm (step S7), and, if so, the relevance score for each input and candidate input of the new set of inputs is evaluated (step S9), it is determined whether or not the relevance score of each input of the current set of inputs is less than an input exclusion threshold (step S11), it is determined whether or not the relevance score of each candidate input of the current set of inputs is greater than an input inclusion threshold (step S15), and it is determined whether or not to trial a new candidate input (step S19).

In the first iteration of the method, step S15 could not be meaningfully performed as there were no candidate inputs to evaluate. However, in this third iteration, the new set of inputs includes the candidate input 'TU-C vendor identifier', which was used in the third instance of the algorithm and now has a relevance score (calculated in step S9). Accordingly, in this third iteration, the relevance score for candidate input TU-C vendor identifier is compared to an input inclusion threshold to determine if it should be used in subsequent iterations of the algorithm. If the relevance score does not satisfy the input inclusion threshold, then the candidate input is not accepted for subsequent iterations of the algorithm. If the relevance score does satisfy the input inclusion threshold, then the candidate input is accepted for subsequent iterations of the algorithm (step S17) and is promoted from being a candidate input to an input of the set of inputs.

This embodiment therefore provides the benefit of evaluating the relevance of each input to an algorithm (based on both the input's effectiveness and the input's computational cost) and removing the input if it is not sufficiently relevant and accepting candidate inputs if they are sufficiently relevant. This ensures that the algorithm is only using inputs that meet an operator defined balance of performance against use of computing resources. This process is also applied iteratively so that the algorithm's inputs may be evaluated based on their current relevance score, keeping the algorithm optimised in a dynamic environment.

Figure 4:
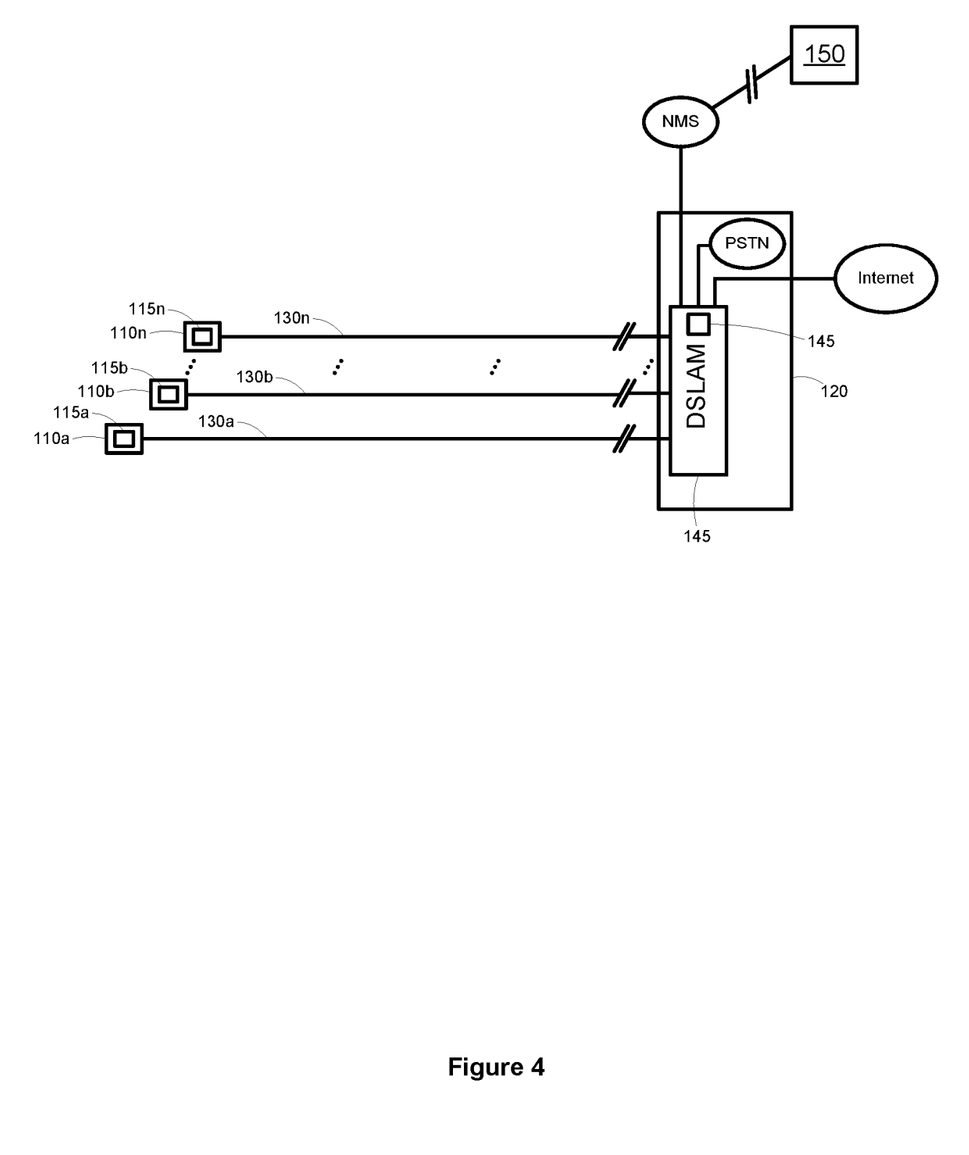
FIG. 4 is a schematic diagram illustrating a DSL system and computing system of a second embodiment of the present invention.

A second embodiment of the present invention will now be described with reference to FIG. 4. FIG. 4 also illustrates a DSL system 100, which, in this second embodiment, includes a plurality of Customer Premises Equipment (CPE) 110a . . . 110n connected to an exchange 120, each via a subscriber line 130a . . . 130n. In the exchange 120, the subscriber lines 130a . . . 130n terminate at an aggregation transceiver device, in this example a Digital Subscriber Line Access Multiplier (DSLAM) 140, which is configured to provide Internet and telephony services to each CPE via each subscriber line. The DSLAM thus provides onward connections to the Internet, to a PSTN, and to a Network Management System (NMS).

The CPEs 110a . . . 110n and DSLAM 140 all include a control unit 115a . . . 115n, 145, which are configured to measure certain properties of a modem located in the CPE or DSLAM, or the associated subscriber line, and store them in memory. In this embodiment, the control units 115a . . . 115n, 145 are configured to store DSL-related parameters such as Signal to Noise Ratio (SNR), SNR margin, error counts, retrain counts, etc. In this embodiment, the control units 115a . . . 115n, 145 are also configured to store non-DSL-related parameters such as the line's resistance, moisture levels, etc., which are also stored in memory. Furthermore, each subscriber line 130a . . . 130n may include a further control unit (not shown), provided at any point along its length, which is also configured to perform measurements of the various DSL-related and non-DSL-related parameters noted above.

The various control units 115a . . . 115n, 145 are all configured to report their stored DSL-related and non-DSL-related parameters to the NMS. In this embodiment, the NMS receives this data once per day and each day's data is stored, creating a timeline of operational data for subsequent analysis.

FIG. 4 also illustrates a computing system 150, which is configured to receive the data from the NMS. The computing system 150 is also connected to a plurality of DSL systems (although only one DSL system 100 is shown in FIG. 4) and also receives equivalent data from an NMS of each of the plurality of DSL systems. The computing system 150 may therefore receive data relating to thousands, or even millions, of DSLs.

In the DSL system 100, a user of one CPE may terminate their service with the Network Operator. The user's line may remain inactive, or the user may be switched to a service provided by another Network Operator (where the telecommunications system is unbundled and services can be provided by several Network Operators along the same subscriber line). In any case, the user may want to request that their service be provided again by the original Network Operator. As some time has passed since the original Network Operator served that user via that line, the Network Operator must decide whether to a) automatically restart the service without sending out an engineer, or b) send an engineer out to inspect the line and associated infrastructure and manually restart it. There is a greater chance of the line developing a fault with option a) over option b), and such a fault would have a negative impact on the customer experience. However, there is a greater financial cost associated with option b) over option a). Accordingly, the Network Operator must make a decision on which lines it would be beneficial to use option a) over option b).

In this embodiment, an algorithm is used to decide whether the Network Operator should automatically restart the service or send an engineer to manually restart it. This algorithm may take into account, for example, the amount of time that has passed since the Network Operator terminated service to that user, DSL fault statistics of neighbouring lines, and the various DSL-related and non-DSL-related data noted above. The computing system 150 is therefore configured to retrieve the input vector of values for each subscriber line to be restarted and apply each input vector to the algorithm, which will output the decision for each subscriber line.

The Network Operator may then act upon this output. With either option a) or option b), there are two possible outcomes. One option is a success, which in this example means that the service is successfully restarted without a fault occurring in the near future. The second option is a failure, in which the service does not successfully restart and enters a fault state either immediately or shortly after restarting. A second embodiment of the method of the present invention will now be described with reference to FIG. 5.

Figure 5:
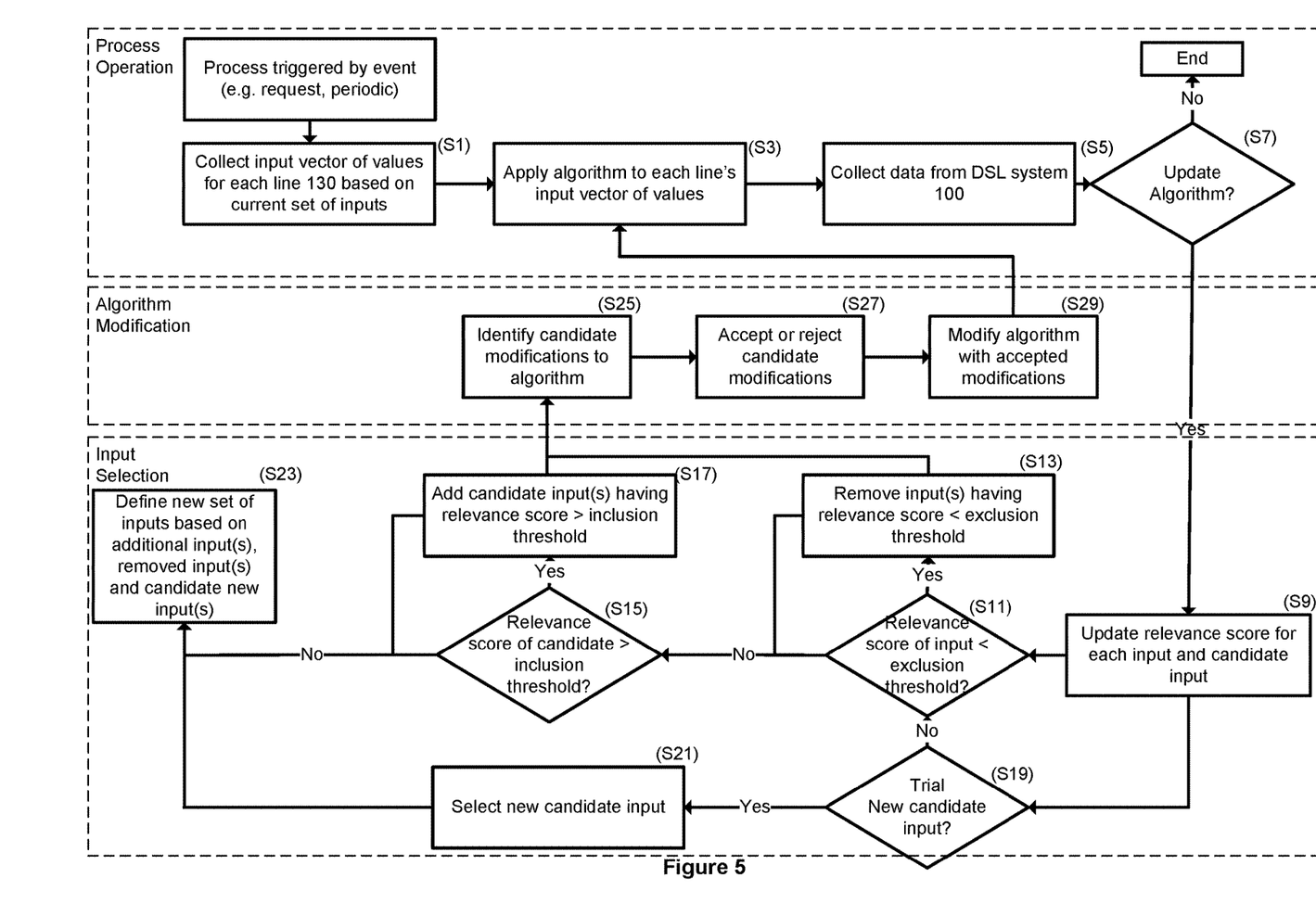
FIG. 5 is a flow diagram illustrating a second embodiment of a method of the present invention.

In this second embodiment, the method is triggered by a request to restart a subset of the plurality of subscriber lines (e.g. several thousand subscriber lines across various DSL systems).

In step S1, the computing system 150 retrieves an input vector of values for each subscriber line 130 of the subset of subscriber lines to be restarted based on an initial set of inputs. In this example, the initial set of inputs are length of time of inactivity and line length.

In step S3, the computing system 150 then applies the current algorithm to each subscriber line's input vector of values, which outputs a decision (automatically restart or send an engineer) for each subscriber line 130 of the subset of subscriber lines. The computing system 150 then collects data from the DSL system 100 (e.g. via the NMS), which indicates the subsequent performance of each subscriber line of the subset of subscriber lines.

In step S7, it is determined whether to update the algorithm. If the decision is negative, then the process ends (such that this embodiment is a discrete event driven process, rather than a continuous process of the first embodiment). In this example, the decision is positive and the method advances to step S9.

In step S9 of this first iteration of the second embodiment, the computing system 150 computes relevance scores for each input of the initial set of inputs. This may be performed in the same manner as described above in the first embodiment. The method then advances in two paths to steps S11 and S19. Step S11 (and subsequent step S13) are also performed in the same manner as the first embodiment, so that any input of the initial set of inputs that does not have a relevance score satisfying an exclusion threshold is identified for removal. Subsequent steps S15 and S17 are not relevant in this first iteration of the second embodiment, as there are no candidate new inputs in the set of inputs to review for inclusion.

In step S19 of the first iteration of this second embodiment, the computing system 150 determines that a new candidate input should be trialed in subsequent iterations and so the method proceeds to step S21. In step S21, the computing system 150 identifies a first candidate input that also represents line length, but is instead a comparison of the line length to a length threshold (which differs from the line length input of the initial set of inputs which used the measured value of the line's length). This is an example of a pre-processed input in which the data gathering node (the CPE or DSLAM in this example) retrieves a value for the parameter and then applies some processing to the input before transmission to the computing system 150. In this example, the pre-processing is for the data gathering node to compare the length value to a threshold to determine whether the line's length is above or below this threshold. The data gathering node may then report a single binary value (0 or 1) to the computing system to indicate whether the line's length is above or below the threshold.

In step S23, the new set of inputs is defined as the initial set of inputs minus any excluded inputs (none in this example) and with the addition of the candidate input binary line length.

Following a second trigger event, the method is performed for a second time and, in step S1, values are retrieved for each input. Furthermore, as the candidate input requires pre-processing, the line length is compared to a line length threshold to determine whether the line length is above or below the threshold. The values are reported to the computing system 150 (via the NMS) for processing.

Steps S3 to S7 are performed in this second iteration, and the decision of step S7 is to update the algorithm. Similar to the second iteration of the first embodiment above, the algorithm is now updated so as to utilise the new candidate input. Otherwise, no changes are made to the algorithm or the set of inputs in this second iteration.

Following a third trigger event, the method is performed for a third time and, in step S1, values are retrieved for each input. Steps S3 to S7 are performed in this third iteration, and the decision of step S7 is to update the algorithm. In step S9, relevance scores are calculated for the inputs and candidate new inputs, which includes both the real value of the line length (e.g. 103 m) and a binary value indicating whether this is above or below a threshold (e.g. 0 or 1). As noted above, the relevance scores are based on both an effectiveness value for the input and a computational cost of the input. The effectiveness value may therefore be the same or different for the algorithm utilising the real value of the line length compared to the algorithm utilising the binary value for line length. It is likely that the effectiveness value will decrease for a binary value compared to a real value.

Furthermore, the computational cost may differ for the algorithm using the real value of line length compared to the binary value for line length. In this example, the real value of the line length does not require any processing by the data gathering node whereas the binary value does require some processing. Accordingly, the processing power required by the data gathering node increases for the binary value. However, in the event the computational cost is based on processing utilisation across the whole distributed system, the computational cost may be unchanged or even lower (as the processing utilisation of the data gathering node may be much lower than the computing system 150). Furthermore, the computational cost for transmission of the real value may be higher than that of the binary value (e.g. 4 bytes vs. 1 byte respectively). The relevance score for the real value may therefore differ from the binary value.

In this example, in steps S11 to S17, the input real line length is excluded from the set of inputs and the candidate input binary line length is included.

Furthermore, in step S19 of this third iteration, the computing system 150 again determines that a new candidate input should be trialed in subsequent iterations and so the method proceeds to step S21. A second candidate input is identified which represents a combination of parameters— the line's resistance and the line's capacitance. In this example, the second candidate input is also a binary value (0 or 1), and is equal to 0 if either the line's resistance or line's capacitance is below respective thresholds and is equal to 1 is both the line's resistance and line's capacitance are above their respective thresholds. For comparison purposes, third and fourth candidate inputs are also identified, representing a comparison the line's resistance to the threshold and a comparison of the line's capacitance to the threshold respectively.

In step S23, the new set of inputs is defined as inputs length of line inactivity, binary line length (as the input line length was excluded and the candidate input binary line length was included), and further including the second, third and fourth candidate new inputs.

Following a fourth trigger event, the method is performed for a fourth time and values are retrieved for each input of the new set of inputs. Similar to the second iteration above, the algorithm is updated so as to utilise each input of the new set of inputs.

Following a fifth trigger event, the method is performed for a fifth time and, again, proceeds to step S9 in which the relevance scores of the inputs and candidate inputs are determined. In this fifth iteration, the relevance of the second candidate input (being a combination of parameters) and the relevance of the third and fourth candidate inputs (being the respective component parameters of the second candidate input) may be compared. Again, the effectiveness and computational costs may differ for the algorithm when using the second candidate new input compared to the algorithm using both the third and fourth candidate new inputs (for example, the transmission cost of the second candidate new input would be half the transmission cost of both the third and fourth candidate new inputs). Thus, in steps S15 and S17, the relevance scores of these candidate new inputs may be compared to the inclusion threshold so that either the second candidate new input (being a combination of parameters) or the third and fourth candidate new inputs (being the constituent parameters of the second candidate input) may be included in the new set of inputs.

In the above first and second embodiments, the decision at step S7 was always positive. However, the decision may be negative and therefore the algorithm (and the set of inputs used in the algorithm) may remain the same for several iterations. Furthermore, even if the decision in step S7 is positive, inputs may not be excluded, candidate new inputs may not be included, and candidate new inputs may not be trialed, such that the set of inputs may remain the same for one or more further iterations.

In the above embodiments, a "surrogacy" method is used to determine the effectiveness value for each input. The surrogacy method detailed above utilised the results of the current algorithm as a performance goal, however, this is non-essential. Furthermore, the computing system 150 may use alternative methods to assess the effectiveness of an input to the performance of the algorithm, including:

a count of tests in the algorithm (e.g. a count of nodes in a decision tree) in which the input is used;

performing a consolidation operation (e.g. pruning) to create a new algorithm that has the same or substantially the same outputs for a given set of inputs, and analysing the new algorithm to determine if any inputs are no longer used;

feature reduction using Principal Component Analysis (PCA); and other statistical methods (e.g. Bayesian criteria).

In the above embodiments, inputs were removed from the set of inputs if they did not satisfy the exclusion threshold. If there are two inputs that do not satisfy the exclusion threshold, then only a single input may be excluded and the steps of S9 to S13 may be repeated so as to calculate a new effectiveness value (and new relevance score) for the remaining inputs without the excluded input. Two inputs may be mutually correlated so as to produce the same (or very similar results), so that by excluding a first input in a surrogate algorithm then the second input would recreate the same results and the first input would be assigned a very low effectiveness score (when actually both are very effective). Thus, by excluding the first input only and repeating steps S9 to S13 (so that the effectiveness value of the second input is calculated by defining a surrogate algorithm without reference to both the first and second input), the effectiveness value (and therefore relevance score) for each input is more accurate.

Furthermore, the skilled person will understand that the use of a decision tree algorithm is non-essential. That is, regardless of the algorithm used and the machine learning process used to modify it, the computing system 150 may still determine a relevance score for each input and include/exclude inputs based on their relevance score.

In the above embodiments, the input selection steps were performed by the computing system 150 (a centralised entity), but this is also non-essential. In alternative arrangements, the input selection steps may be distributed. For example, the data gathering node may select candidate new inputs to be used in subsequent iterations of the algorithm.

In the second embodiment above, some candidate new inputs were pre-processed by comparing the real input value to a threshold to create a binary value. However, this is not the only form of pre-processing that may be performed and later assessed to determine whether it creates more relevant inputs for the algorithm. For example, the pre-processing may be based on a compression operation that reduces the transmission cost of the input.

When selecting candidate new inputs in step S21, they may be selected at random, or they may be selected based on a weighting (e.g. operator defined). Furthermore, the candidate new inputs may be trialed on a subset of lines.

The above embodiments are based on a DSL system. However, this is non-essential and the skilled person will understand that the methods of these embodiments may be applied in any form of computing system in which an algorithm is being operated.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer-implemented method of modifying an algorithm operating on a computing system, the method comprising the steps of:

applying the algorithm to a first set of inputs;

determining a relevance score for a first input of the first set of inputs based on:

a first effectiveness value of the first input, wherein the first effectiveness value represents a degree of influence of the first input on an output of the algorithm, and a first computational cost of the first input, wherein the first computational cost represents the computational resources of using the first input in the algorithm;

comparing the relevance score for the first input to an operator defined threshold;

defining a second set of inputs based on the comparison of the relevance score of the first input to the threshold such that:

if the relevance score of the first input does not satisfy the threshold, the second set of inputs is based on the first set of inputs with the first input removed, and if the first input is a candidate input and the relevance score for the first input satisfies the threshold, the second set of inputs includes accepting the first input; and applying the algorithm to the second set of inputs.

2. A method as claimed in claim 1, wherein the algorithm operates to select an operating profile from a set of operating profiles for use in a Digital Subscriber Line, DSL, system, each operating profile of the set of operating profiles specifying one or more operating parameters.

3. A method as claimed in claim 1, wherein the algorithm operates to determine whether to automatically or manually restart a service operating on a Digital Subscriber Line, DSL, system.

4. A method as claimed in claim 1, further comprising the steps of:
   determining a relevance score for a second input of the first set of inputs, wherein the second input is a candidate input, based on:
      a second effectiveness value of the second input, wherein the second effectiveness value represents how influential the second input is on the output of the algorithm, and
      a second computational cost of the second input, wherein the second computational cost represents the computational resources of using the second input in the algorithm;
   comparing the relevance score for the second input to the threshold,
   wherein the step of defining the second set of inputs is further based on the comparison of the relevance score for the second input to the threshold such that if the relevance score of the first input does not satisfy the threshold and the relevance score of the second input does satisfy the threshold then the second set of inputs is based on the first set of inputs with the first input removed and further includes accepting the second input.

5. A method as claimed in claim 1, wherein the second set of inputs includes a new candidate input.

6. A method as claimed in claim 5, wherein the second computational cost includes one or more of the processing cost, storage cost and transmission cost associated with the second input.

7. A method as claimed in claim 1, wherein the first computational cost includes one or more of the processing cost, storage cost and transmission cost associated with the first input.

8. A method as claimed in claim 1, wherein the algorithm is updated by a machine learning process.

9. A method as claimed in claim 1, wherein the first input represents a combination of parameters.

10. A method as claimed in claim 1, wherein a value of the first input is determined by a data gathering node, and the first input is pre-processed by the data gathering node.

11. A non-transitory computer-storage medium storing instructions which, when the program is executed by a computer, cause the computer to carry out the method of claim 1.

12. A device for modifying an algorithm operating on a computing system, the algorithm operating on a first set of inputs, the device comprising a processor configured to:
   determine a relevance score for a first input of the first set of inputs based on:
      a first effectiveness value of the first input, wherein the first effectiveness value represents a degree of influence of the first input on an output of the algorithm, and
      a first computational cost of the first input, wherein the first computational cost represents the computational resources of using the first input in the algorithm;
   compare the relevance score for the first input to an operator defined threshold;
   define a second set of inputs based on the comparison of the relevance score of the first input to the threshold such that:
      if the relevance score of the first input does not satisfy the threshold, the second set of inputs is based on the first set of inputs with the first input removed, and
      if the first input is a candidate input and the relevance score for the first input satisfies the threshold, the second set of inputs includes accepting the first input; and
   cause the algorithm to use the second set of inputs.

13. The device as claimed in claim 12, wherein the algorithm is configured to operate to select an operating profile from a set of operating profiles for use in a Digital Subscriber Line (DSL) system, each operating profile of the set of operating profiles specifying one or more operating parameters.

14. The device as claimed in claim 12, wherein the algorithm is configured to operate to determine whether to automatically or manually restart a service operating on a Digital Subscriber Line (DSL) system.

15. The device as claimed in claim 12, wherein the device is configured to:
   determine a relevance score for a second input of the first set of inputs, wherein the second input is a candidate input, based on:
      a second effectiveness value of the second input, wherein the second effectiveness value represents how influential the second input is on the output of the algorithm, and
      a second computational cost of the second input, wherein the second computational cost represents the computational resources of using the second input in the algorithm;
   compare the relevance score for the second input to the threshold,
   wherein the definition of the second set of inputs is further based on the comparison of the relevance score for the second input to the threshold such that if the relevance score of the first input does not satisfy the threshold and the relevance score of the second input does satisfy the threshold then the second set of inputs is based on the first set of inputs with the first input removed and further includes accepting the second input.

16. The device as claimed in claim 12, wherein the second set of inputs includes a new candidate input.

17. The device as claimed in claim 16, wherein the second computational cost includes the processing cost, storage cost and/or transmission cost associated with the second input.

18. The device as claimed in claim 12, wherein the first computational cost includes the processing cost, storage cost and/or transmission cost associated with the first input.

19. The device as claimed in claim 12, wherein the algorithm is updated by a machine learning process.

20. The device as claimed in claim 12, wherein a value of the first input is determined by a data gathering node, and the first input is pre-processed by the data gathering node.

* * * * *